United States Patent Office 3,030,219
Patented Apr. 17, 1962

3,030,219
ASPHALTIC COMPOSITION
Charles C. Clark, Kenmore, and Roman W. Kulow, Niagara Falls, N.Y., assignors to Olin Mathieson Chemical Corporation, a corporation of Virginia
No Drawing. Filed Aug. 18, 1958, Ser. No. 755,388
3 Claims. (Cl. 106—123)

This invention relates to asphaltic compositions having improved mineral aggregate coating and anti-stripping properties.

Asphalt is one of the most useful and versatile of all materials. Industrially it is combined with mineral aggregates, mineral and vegetable fibers, soils, rubber, pigments, etc. For engineering applications, combinations with fillers, soils and other mineral aggregates are used predominantly. One of the most serious problems encountered in such engineering applications is the tendency of the asphalt to be displaced from the mineral surface with which it is associated by water, either in liquid or vapor phase. Such displacement of asphalt from the mineral surface by water is known in the art as stripping. Damage from stripping normally results because a mineral surface, unless specially treated or used under special conditions, ordinarily has more affinity for water than for asphalt. It is an object of this invention to provide asphaltic compostions which, when admixed with fillers, soils and other mineral aggregate, strongly resist this stripping action.

U.S. Patent 2,361,457, issued October 31, 1944 to Charles C. Clark describes certain products which are obtained by the amination of chlorinated kerosene, and the fatty acid salts thereof.

It has now been found that these animated chlorinated kerosenes are especially effective in imparting anti-stripping properties to asphaltic compositions. Accordingly the present invention is directed to asphaltic compositions having improved anti-stripping properties including asphalt and from about 0.10 to 5.0 percent, preferably 0.25 to 2.5 percent by weight based on the asphalt of a material selected from the group consisting of products obtained by the amination of chlorinated kerosene and fatty acid salts thereof. Preferably the aminated chlorinated kerosenes analyze from about 0.5 to 6 percent by weight of nitrogen and from about 10 to about 30 percent by weight of chlorine.

Asphalts for commercial uses come from refineries as penetration or paving grade asphalts and as liquid asphalts, including rapid-curing cutbacks, medium-curing cutbacks, and slow-curing oils (road oils and fuel oils). Rapid-curing cutbacks are made from paving asphalts by adding naphtha or gasoline; medium curing by adding kerosene; and slow curing oils are partially distilled asphaltic crudes.

In practice a somewhat arbitrary division is made between mineral particles less than 200 mesh (74 microns) in size and those larger than this, the former being called fillers and the latter aggregates. Suitable minerals include silicas, limestones, slates, slags, asbestos, dolomites, etc., which are well known to the art.

In general the animated chlorinated kerosenes are prepared by chlorinating a commercially available kerosene at a temperature of about 70° to 95° C. until a chlorine analysis of about 20% to 50% by weight is obtained. The chlorinated kerosene is then aminated under approximately 400–600 pounds pressure with an excess of ammonia in the presence of a lower alkanol as a solvent at a temperature of about 100° to 175° C. for from about 6 to 12 hours. The crude product is then filtered to remove the ammonium chloride formed as a by-product and the filtrate is distilled to remove the excess ammonia and alkanol. The resultant residue as well as the fatty acid addition salts thereof are the effective anti-stripping agents. The fatty acid addition salts are prepared by simple heating of the residue with the appropriate fatty acid at temperatures of 60° to 100° C.

The following examples illustrate in further detail the preparation and properties of the compositions of this invention.

EXAMPLE I

A commercially available kerosene having a specific gravity at 25° C. of 0.742 was used in this example. A 5,350 gram portion of this material was transferred to a chlorinator consisting of a 5-liter Pyrex flask provided with a gas inlet tube and a motor driven stirrer. The flask was illuminated with 200 watts of tungsten light and chlorine gas was bubbled in at a constant rate. External heating was applied to initiate the reaction. The heat of reaction was sufficient to maintain the required temperature. The progress of the reaction was followed by withdrawing samples periodically and measuring the specific gravity. Each batch was weighed to determine the weight increase. Successive fractions containing respectively 25, 30, 35, 40 and 45 percent chlorine by weight were obtained. The first fraction was removed after 81.7 hours of chlorination at a mean temperature of 108° C. The specific gravity of this sample at 25° C. was 0.923. Analysis of this fraction showed a chlorine content of 25.5 percent by weight. Data for subsequent fractions taken at intervals is shown in Table I below. The total weight of chlorinated kerosenes obtained was 8187 grams.

*Table I*

CHLORINATION OF KEROSENE

| Fraction | 1 | 2 | 3 | 4 | 5 |
|---|---|---|---|---|---|
| Weight, Grams | 1,480 | 973 | 1,111 | 1,097 | 3,526 |
| Sp. Gr. at 25 C | 0.923 | 0.960 | 1.010 | 1.075 | 1.120 |
| Chlorine Analysis, percent | 25.6 | 30.2 | 34.7 | 41.5 | 45.3 |
| | 25.4 | 30.4 | 35.1 | 41.6 | 45.6 |

Samples of the chlorinated kerosene fractions obtained above were aminated in a rocking stainless steel autoclave. For each 500 grams of the chlorinated kerosene samples, 572 grams of a mixture of 100 parts of 95% ethanol and 10 parts of 100% methanol, and 1100 grams of liquid ammonia were charged to the autoclave and heated at 150° C. for 6 hours at a maximum autogenous pressure of approximately 550 p.s.i.g. On cooling, the reaction mixture was filtered to remove ammonium chloride, then heated to 110° C. to remove ammonia and alcohol. The resultant residue was weighed and submitted for analysis. Data for the aminated products obtained in this example are given in Table II below.

Table II

AMINATION OF CHLORINATED KEROSENE

| Fraction | 1 | 2 | 3 | 4 | 5 |
|---|---|---|---|---|---|
| Weight of Chlorinated Kerosene Used (grams) | 975 | 970 | 954 | 1,056 | 1,095 |
| Chlorine Analysis (percent) | 25.5 | 30.3 | 34.9 | 41.5 | 45.5 |
| Weight of Ammonium Chloride Obtained (gms.) | 75 | 158 | 189 | 314 | 485 |
| Weight of Aminated Chlorinated Kerosene Obtained (grams) | 600 | 873 | 821 | 873 | 863 |
| Chlorine Analysis (percent) | 15.8 | 19.0 | 23.3 | 18.2 | 20.0 |
| Nitrogen Analysis (percent) | 1.9 | 2.4 | 2.6 | 1.0 | 5.4 |
| Weight of Ammonia Used (grams) | 2,330 | 2,255 | 2,234 | 2,362 | 2,297 |

EXAMPLE II

The aminated chlorinated kerosene obtained as fraction 3 above was further aminated. A total of 300 grams of the 821 grams of crude aminated chlorinated kerosene obtained as fraction 3 was charged to the autoclave together with 136 grams of liquid ammonia and 750 ml. of the alcohol mixture of Example I. This charge was maintained at 150° C. and 300 p.s.i.g. for 6 hours. Upon cooling, the reaction mixture was filtered to remove 39.0 grams of ammonium chloride then heated to 110° C. to remove the ammonia and alcohol. The resultant residue weighed 277 grams. It contained 16.1, 16.7 percent chlorine and 4.53, 4.63 percent nitrogen.

EXAMPLE III

Ten gram samples of each of the aminated chlorinated kerosenes obtained as fractions 1–5 of Example I were each heated with 2 grams of Pamak-4, a commercial tall oil fatty acid, at 60° C. for 1 hour in order to obtain the addition salts. Pamak-4 contains 5% rosin acids, 4.5% unsaponifiables, and 95% fatty acids of which latter 50.6% is oleic acid, 47.2% is linoleic acid and 2.2% are saturated acids, largely palmitic acid.

The crude aminated chlorinated kerosenes obtained as fractions 1–5 of Example I and in Example II and the tall oil addition sales of fractions 1–5 of Example III above were evaluated as apshalt additives to prevent stripping of the asphalt from the aggregate according to the following procedure: A standard MC-3 type cutback asphalt (78 percent paving asphalt, 22 percent kerosene) was used as the base material. Asphalt compositions of this invention were prepared by adding 1% by weight of the aminated chlorinated kerosenes and 2% by weight of the tall oil addition salts to the MC-3 cutback asphalt. These asphalt compositions were tested on eight types of road building stone by the standard test method employed by the Department of Public Works of the State of New York entitled, "Requirements for Bituminous Materials Treated With an Anti-Stripping Agent— R.C. and M.C. Materials—Grades 3, 4 and 5." In this method, 100 grams of standard reference stone is mixed with 2 grams of distilled water in a 12-ounce seamless tinplate box with sufficient stirring to cover each particle of stone with a film of moisture. To the moistened stone is added 6.5 grams of the asphalt composition to be tested which has been heated to 140° F. The mixture is then stirred for three minutes with a stiff spatula. The coated stone is cured in an oven at 140° F. for 2 hours and then allowed to cool to room temperature. While cooling the material is re-mixed with the spatula until the mixture stiffens to insure even coating of the stone. The container is filled with distilled water and allowed to stand for 16 to 24 hours. Then the material is examined visually and an estimate is made of the degree of stripping. The results of the stripping test are reported as a percentage of the surface of the stone from which the asphalt coating has been removed by the water immersion. The area of stone coated should be not less than 95 percent.

The results obtained in these evaluations, together with the results obtained in evaluating two commercially available anti-stripping agents designated A and B, are shown in Table III below.

Table III

RESULTS OF STRIPPING TESTS

| Additive | Percent Aggregate Stripped | | | | | | | |
|---|---|---|---|---|---|---|---|---|
| | N.Y. | Va. Gravel | Va. Dolomite | Wy. | Pa. | Ky. | W. Va. | Colo. |
| Example I: | | | | | | | | |
| Fraction 1 | 5 | 5 | 10 | 5 | 5 | 5 | 10 | 5 |
| Fraction 2 | 5 | 5 | 15 | 10 | 5 | 5 | 10 | 5 |
| Fraction 3 | 10 | 10 | 15 | 25 | 8 | 5 | 8 | 5 |
| Fraction 4 | 5 | 5 | 15 | 10 | 5 | 5 | 5 | 10 |
| Fraction 5 | 5 | 5 | 15 | 10 | 5 | 5 | 5 | 10 |
| Example II | 2 | 2 | 5 | 2 | 2 | 2 | 2 | 2 |
| Example III: | | | | | | | | |
| Fraction 1 (salt) | 5 | 5 | 5 | 10 | ---- | 5 | 10 | 10 |
| Fraction 2 (salt) | 5 | 10 | 5 | 15 | ---- | 8 | 5 | 10 |
| Fraction 3 (salt) | 10 | 10 | 10 | 15 | ---- | 15 | 20 | 15 |
| Fraction 4 (salt) | 15 | 5 | 15 | 10 | ---- | 15 | 8 | 15 |
| Fraction 5 (salt) | 10 | 10 | 15 | 15 | ---- | 30 | 20 | 15 |
| A | 10 | 10 | 10 | 10 | 5 | 10 | 5 | 5 |
| B | 5 | 5 | 10 | 8 | 8 | 8 | 10 | 10 |

The data indicate that the anti-stripping properties of the asphaltic compositions of this invention compare favorably with those of the two commercial products.

In addition to the tall oil fatty acids employed in Example III, other fatty acids can be employed. Suitable fatty acids include those having from about 10–24 carbon atoms such as oleic acid, stearic acid, lauric acid, palmitic acid, linoleic acid etc.

We claim:

1. An asphaltic composition having improved stripping properties consisting essentially of asphalt, mineral aggregate and from about 0.25 to 2.5 percent by weight based on the asphalt of a material selected from the group consisting of products obtained by the pressure ammonia amination of chlorinated kerosene and 10 to 24 carbon atom containing fatty acid addition salts of said products, said products analyzing from about 0.5 to 6 percent by weight of nitrogen and from about 10 to 30 percent by weight of chlorine, said products being obtained by chlorinating kerosene at a temperature from about 70° C. to about 95° C. to yield a chlorinated kerosene comprising from about 20 to about 50 percent by weight chlorine, aminating said chlorinated kerosene under pressure of from about 400 p.s.i. to about 600 p.s.i. with an excess of ammonia in the presence of a lower alkanol solvent at a temperature from about 100° to about 175° C. for a period from about 6 to 12 hours, separating from the aminated chlorinated kerosene the ammonium chloride which is formed, and distilling the separated aminated chlorinated kerosene to remove excess ammonia and alkanol solvent.

2. The composition of claim 1 in which the fatty acid addition salts of the aminated chlorinated kerosene are obtained by heating the aminated chlorinated kerosene to a temperature within the range from about 60° to about 100° C. in the presence of fatty acid.

3. The composition of claim 1 in which the fatty acid addition salts are tall oil fatty acid addition salts.

References Cited in the file of this patent

UNITED STATES PATENTS

| 2,191,295 | Dohse | Feb. 20, 1940 |
| 2,314,111 | Tucker et al. | Mar. 16, 1943 |

(Other references on following page)

UNITED STATES PATENTS

| | | |
|---|---|---|
| 2,322,202 | Jayne et al. | June 15, 1943 |
| 2,361,457 | Clark | Oct. 31, 1944 |
| 2,461,971 | Fischer | Feb. 15, 1949 |
| 2,483,797 | Van Valkenburgh | Oct. 4, 1949 |
| 2,514,954 | Johnson et al. | July 11, 1950 |
| 2,534,713 | Hankins | Dec. 19, 1950 |
| 2,679,462 | Monson | May 25, 1954 |
| 2,856,308 | Suprin et al. | Oct. 14, 1958 |
| 2,883,289 | Furey et al. | Apr. 21, 1959 |

FOREIGN PATENTS

| | | |
|---|---|---|
| 524,030 | Canada | Apr. 17, 1956 |
| 1,007,203 | France | May 5, 1952 |